Oct. 23, 1956   J. R. TURBIVILLE   2,767,471
DEVICE FOR MEASURING LENGTH OF TROUSERS
Filed July 31, 1953
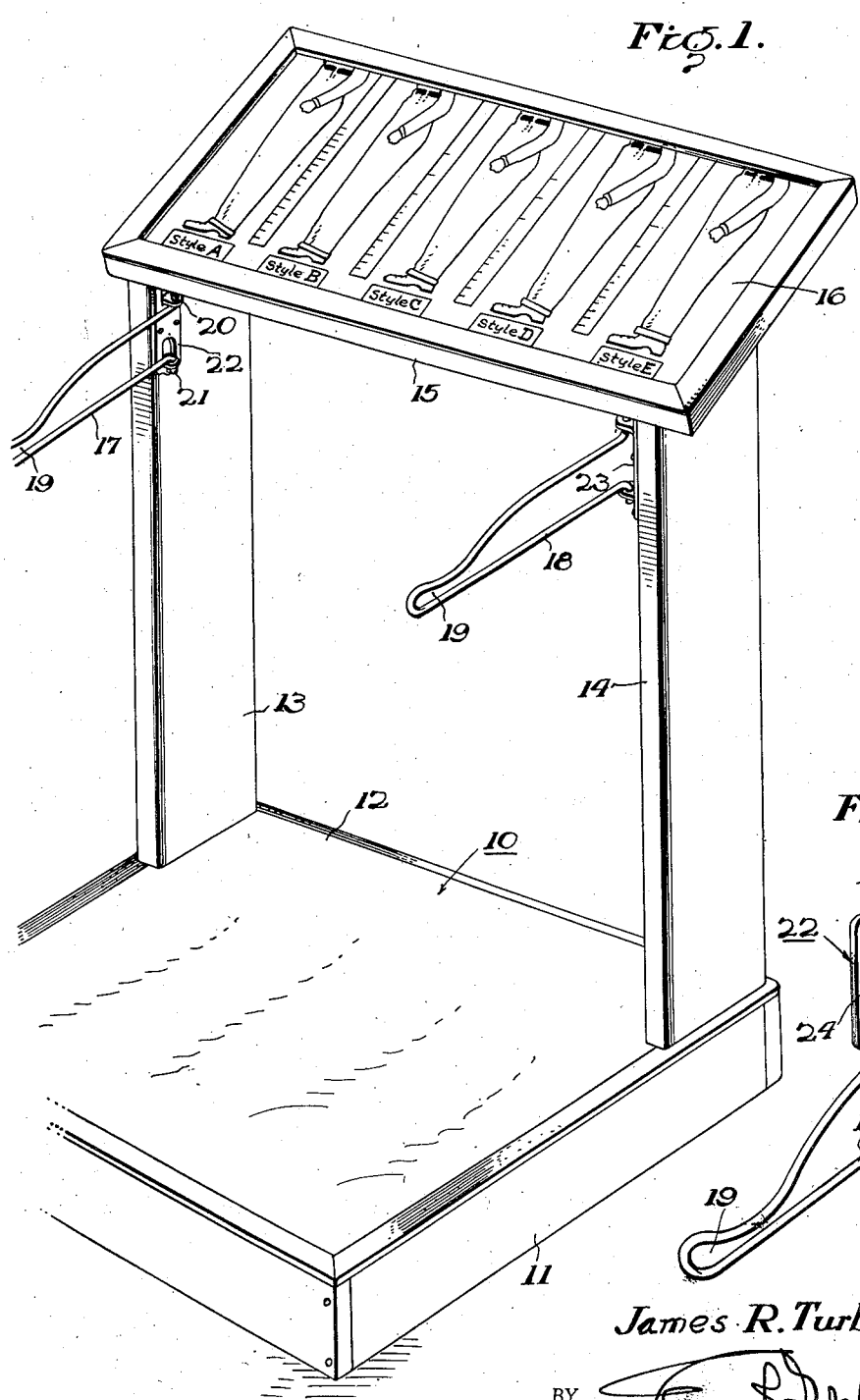
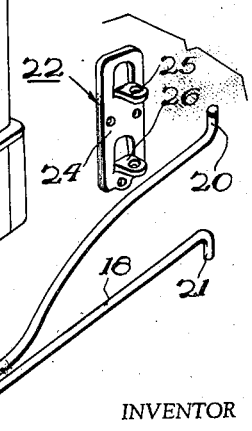
INVENTOR
James R. Turbiville.
BY
ATTORNEY United States Patent Office 2,767,471
Patented Oct. 23, 1956

2,767,471

DEVICE FOR MEASURING LENGTH OF TROUSERS

James R. Turbiville, Greensboro, N. C.

Application July 31, 1953, Serial No. 371,659

1 Claim. (Cl. 33—8)

The present invention relates to a novel means for determining the correct length of inseams of men's trousers.

It is a general practice in most clothing stores to use a tape measure to determine the correct length of the inseam on trousers from the crotch to a point on the side of the shoe heel. This measured point on the heel may be anywhere from one inch to three inches above the floor, depending on the length the customer likes to wear his trousers, that is, with a full break, medium break, small break, or without a break. Then the measurer writes on an alternation ticket a measurement figure which he hopes might give the customer the length he wants. However, in many cases it does not give the customer the desired length. This results in an unsatisfied customer and also the costly labor of taking out all the work done on the cuff and doing the job over.

An object of the present invention is to provide a novel device, whereby all uses of measuring tapes are eliminated and whereby the results of the inseam measurement are accurately in conformity with the customer's selected inseam length.

Another object is to eliminate all measurements from the trouser crotch, whereby women as well as men may take the necessary measurements and easily determine the correct length of trousers for men customers.

Another object is to provide means for trouser inseam measurement enabling sales people with little or no experience to determine the correct length of trouser for the customer.

Still another object is to provide a device having a fixed point from which all measurements are taken in cooperation with a precalculated length chart, whereby the correct length is quickly and accurately obtained.

A further object is to provide a device of great simplicity and one which is inexpensive to build and durable for many years of use.

With these and other objects in view which will become apparent as the invention is fully understood, the same resides in the novelty of construction, combination and arrangement of elements hereinafter described in detail and distinctly claimed in the appended claim.

The description should be read in conjunction with the accompanying drawings, wherein:

Figure 1 is a general perspective view of the device set up for use.

Figure 2 is a detailed view of one of the inseam marking means and showing the pivoted mounting for the same.

Referring in detail to the drawing, the device comprises a base, such as a platform 10 to be supported from the floor by side strips or blocks 11. This platform may be made of any suitable material. For example, a flat piece of plywood covered with a material, such as linoleum 12 glued to the plywood may be used. Around the perimeter of the platform 10 are the floor engaging side strips 11, said strips being nailed and glued to the plywood edges so as to have the linoleum surface substantially flush with the upper edges of the strips and elevate the bottom of the platform from the floor.

Extending vertically upward from the rear at each opposite side of the platform 10 are spaced uprights, such as the boards 13 and 14. These uprights are equal in height and serve to support a chart panel 15, which is relatively narrower than the platform 10, above which it is positioned. This chart panel may be permanently or detachably mounted in the ends of the uprights and carries a standardized style chart with styles A, B, C, D, and E thereon and corresponding length measurements.

The chart 16 may have thereon a picture of the five different lengths or styles that correspond to lengths or styles such as men wear. Thus the customer looks at the picture on the chart and selects his desired style A, B, C, D or E and the salesman will then have the customer stand upon the platform 10 with the trousers being purchased or to be marked as hereinafter explained.

To mark the trouser inseams, there are mounted on the inner facing sides of each upright 13 and 14, a chalk holder arm, such as 17 and 18, respectively. These arms are each formed from a steel rod reversely bent to form a chalk holding slot 19. Also the ends of the bent rod are turned over to form oppositely extending hooks 20 and 21 to serve as means to engage in the side brackets 22 and 23 mounted on each respective inner oppositely facing side of the uprights. These brackets have a base plate 24 and two vertically spaced ears 25 and 26 formed with vertically aligned openings to receive the extended hooks 20 and 21.

For example, to mount the inseam marker arms for operation all that is necessary is to squeeze the arm to bring the hooks 20 and 21 closer together, thereby permitting the same to be lined up with the openings in the bracket ears 25 and 26. Now by releasing the squeezing pressure in the arm, the hooks 20 and 21 expand due to the resiliency of the rod material into position in the ears. This marker arm mounting arrangement permits the arm to be vertically pivoted or horizontally swung into marking engagement or pressure with the trouser inseam. Each marker arm is positioned so as to mark the trouser inseam at a fixed or predetermined height from the platform 10, for example from the chalk arms down to the platform is preferably exactly fourteen inches, and it is from this fixed measurement that all subsequent figures for cuffing are determined.

In connection with the chart, assuming the customer requested the style C, the tailor will know he is to measure twelve inches down from the chalk mark on the side of the trouser; in order to give the customer the same length as shown in the chart picture. Likewise the tailor would measure 13 inches for style A; 12½ inches for style B; 11½ inches for style D; and 11 inches for style E. The chart to provide for easier vision may be slanted toward the customer with respect to the platform 10. This slant may be provided by cutting the ends of the uprights at an angle before mounting the chart panel thereon.

Thus there is provided a trouser length calculator and marker, whereby the measurements are all taken to the free ends of the trousers from a pair of vertically fixed spaced apart parallel marking arms. For example, each of the marking arms with their respective chalk pieces are fixed at exactly fourteen inches in height above the platform on which the customer is to stand with the free ends of each trouser leg in proximity to his shoes in accordance with a style chart. When the free ends of the trousers are adjusted according to the chart style selected each arm for each respective leg is moved to mark its respective adjacent trouser leg inseam. It is from this fixed measurement point on each trouser leg with respect to the free end of each trouser leg from which all subsequent work is determined.

From the foregoing description the method of using the present novel device is believed to be clear. Also, as many changes could be made in the above construction, combination and arrangement of the parts without departing from the scope thereof, it is to be expressly understood that all matter contained in the above description or shown in the accompanying drawing shall be interpreted as illustrative and not in a limiting sense.

I claim:

Means for determining and marking a standard fixed point on the inseam of each leg of a pair of trousers from the free ends thereof to subsequently measure according to customer selected styles, comprising a platform for a customer to stand upon, a pair of vertically fixed horizontally spaced apart parallel marking arms extending horizontally over the platform at a predetermined height, said arms being formed to carry marking chalk, oppositely spaced uprights for supporting said marking arms, and a bracket mounted on each upright adapted to horizontally pivot said spaced marking arms for movement about the said platform to mark the inseam of each trouser leg.

References Cited in the file of this patent

UNITED STATES PATENTS

| 985,070 | Seeling | Feb. 21, 1911 |
| 1,006,753 | Jackson | Oct. 24, 1911 |
| 1,487,956 | Leibowitz | Mar. 25, 1924 |
| 2,196,145 | Stanziale | Apr. 2, 1940 |

FOREIGN PATENTS

| 447,818 | Germany | July 27, 1927 |